US012129762B2

(12) United States Patent
Kulecki et al.

(10) Patent No.: US 12,129,762 B2
(45) Date of Patent: Oct. 29, 2024

(54) TURBINE ENGINE COMPRESSOR VARIABLE GEOMETRY SYSTEM WITH SPLIT ACTUATION

(71) Applicant: General Electric Company, Schenectady, NY (US)

(72) Inventors: Jakub Kulecki, Warsaw (PL); Leszek Rzeszutek, Warsaw (PL)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/502,934

(22) Filed: Oct. 15, 2021

(65) Prior Publication Data

US 2022/0356813 A1 Nov. 10, 2022

(51) Int. Cl.
*F01D 17/16* (2006.01)
*F04D 29/56* (2006.01)

(52) U.S. Cl.
CPC ......... *F01D 17/162* (2013.01); *F04D 29/563* (2013.01); *F05D 2240/12* (2013.01); *F05D 2250/90* (2013.01); *F05D 2260/50* (2013.01)

(58) Field of Classification Search
CPC . F01D 17/162; F05D 2240/12; F05D 2250/90
See application file for complete search history.

(56) References Cited

U.S. PATENT DOCUMENTS 2,924,375 A * 2/1960 McKissock ........... F01D 17/162 415/150
3,632,224 A 1/1972 Wright
3,861,822 A * 1/1975 Wanger ................. F04D 29/563 415/162
4,080,785 A * 3/1978 Koff ........................ F02K 3/077 60/226.3
4,546,606 A * 10/1985 Bouiller ................ F01D 17/162 60/262
5,259,187 A * 11/1993 Dunbar ..................... F02K 3/06 60/226.3

(Continued)

FOREIGN PATENT DOCUMENTS

CN 107201952 A 9/2017
CN 111140288 A 5/2020

(Continued)

OTHER PUBLICATIONS

Polish Patent Office, "Search Report," issued in connection with Polish patent application No. 437817, Oct. 7, 2021, 13 pages.

(Continued)

*Primary Examiner* — Brian Christopher Delrue
(74) *Attorney, Agent, or Firm* — Hanley, Flight & Zimmerman, LLC

(57) ABSTRACT

Example variable geometry systems with split actuation are disclosed herein. In one example, a compressor is provided that includes a compressor stage and an actuation system. The compressor stage includes a plurality of variable stator vanes arranged along a circumference of the compressor stage. The actuation system is to actuate a first variable stator vane of the compressor stage according to a first schedule and to actuate a second variable stator vane of the compressor stage according to a second schedule.

13 Claims, 11 Drawing Sheets

(56) References Cited

U.S. PATENT DOCUMENTS

| | | | | | |
|---|---|---|---|---|---|
| 5,692,879 | A * | 12/1997 | Charbonnel | F04D 29/563 415/162 |
| 5,794,432 | A * | 8/1998 | Dunbar | F02K 1/16 60/226.1 |
| 5,993,152 | A * | 11/1999 | Schilling | F01D 17/162 415/155 |
| 8,967,945 | B2 | 3/2015 | Nordeen et al. | |
| 9,103,228 | B2 | 8/2015 | Waugh et al. | |
| 10,066,668 | B2 | 9/2018 | Zotz | |
| 10,167,872 | B2 * | 1/2019 | Davidson | F04D 29/563 |
| 10,301,961 | B2 | 5/2019 | Davis et al. | |
| 10,358,934 | B2 | 7/2019 | Bifulco | |
| 10,400,680 | B2 | 9/2019 | Asari et al. | |
| 10,526,911 | B2 | 1/2020 | Pratt et al. | |
| 10,711,798 | B2 | 7/2020 | Halcoussis | |
| 10,815,802 | B2 * | 10/2020 | Prasad | F01D 9/041 |
| 11,168,580 | B2 * | 11/2021 | Avola | F02M 26/05 |
| 2006/0263206 | A1 * | 11/2006 | Bouru | F01D 17/162 415/159 |
| 2011/0167792 | A1 * | 7/2011 | Johnson | F01D 17/162 60/226.3 |
| 2014/0075956 | A1 * | 3/2014 | Patsouris | F02C 6/08 60/785 |
| 2016/0069275 | A1 * | 3/2016 | Lecordix | F02C 9/22 415/146 |
| 2016/0376918 | A1 * | 12/2016 | Swann | F02C 3/04 60/772 |
| 2017/0268374 | A1 | 9/2017 | Sellinger | |
| 2020/0141331 | A1 | 5/2020 | Tramontin | |
| 2020/0191004 | A1 | 6/2020 | Prasad | |

FOREIGN PATENT DOCUMENTS

| | | |
|---|---|---|
| EP | 3670849 | 6/2020 |
| WO | 2011128164 A1 | 10/2011 |

OTHER PUBLICATIONS

China National Intellectual Property Administration, “First Office Action and First Search,” issued in connection with Chinese Patent Application No. 202210355553.3, dated May 31, 2024, 16 pages. [English Translation Included].

* cited by examiner

TURBINE ENGINE COMPRESSOR VARIABLE GEOMETRY SYSTEM WITH SPLIT ACTUATION

CROSS-REFERENCE TO RELATED APPLICATIONS

This patent claims priority to Polish patent application No. P.437817, which was filed on May 7, 2021. Polish Application Serial No. P.437817 is hereby incorporated herein by reference in its entirety. Priority to Polish Patent Application Serial No. P.437817, is hereby claimed.

FIELD OF THE DISCLOSURE

This disclosure relates generally to variable geometry systems, and, more particularly, to a turbine engine compressor variable geometry system with split actuation.

BACKGROUND

Certain axial flow turbomachines, such as gas turbine engines, include an inlet that transports a flow of air into a compressor. The compressor then guides the air through a series of compressor stages of the compressor toward a combustor. Forward compressor stator stages may include variable stator vanes that are actuated to control the flow path geometry and pressure of the air flowing inside the compressor.

BRIEF DESCRIPTION

Example methods, apparatus, and articles of manufacture are disclosed for variable geometry systems with split actuation.

Certain examples provide an example compressor including a compressor stage and an actuation system. The compressor stage includes a plurality of variable stator vanes arranged along a circumference of the compressor stage. The actuation system is to actuate a first variable stator vane of the compressor stage according to a first schedule and to actuate a second variable stator vane of the compressor stage according to a second schedule.

Certain examples provide an example axial flow turbomachine including a compressor, a curved inlet, and an actuation system. The compressor includes a row of variable stator vanes arranged along a circumference of the compressor. The curved inlet is to direct a flow of air into the compressor. The actuation system is to actuate a first variable stator vane of the row of variable stator vanes according to a first schedule and to actuate a second variable stator vane of the row of variable stator vanes according to a second schedule.

Certain examples provide an example apparatus including a first actuator and a first assembly of linkage structures to couple the first actuator with a first variable stator vane in a compressor stage. The example apparatus also includes a second actuator and a second assembly of linkage structures to couple the second actuator with a second variable stator vane in the compressor stage.

Figure 1:
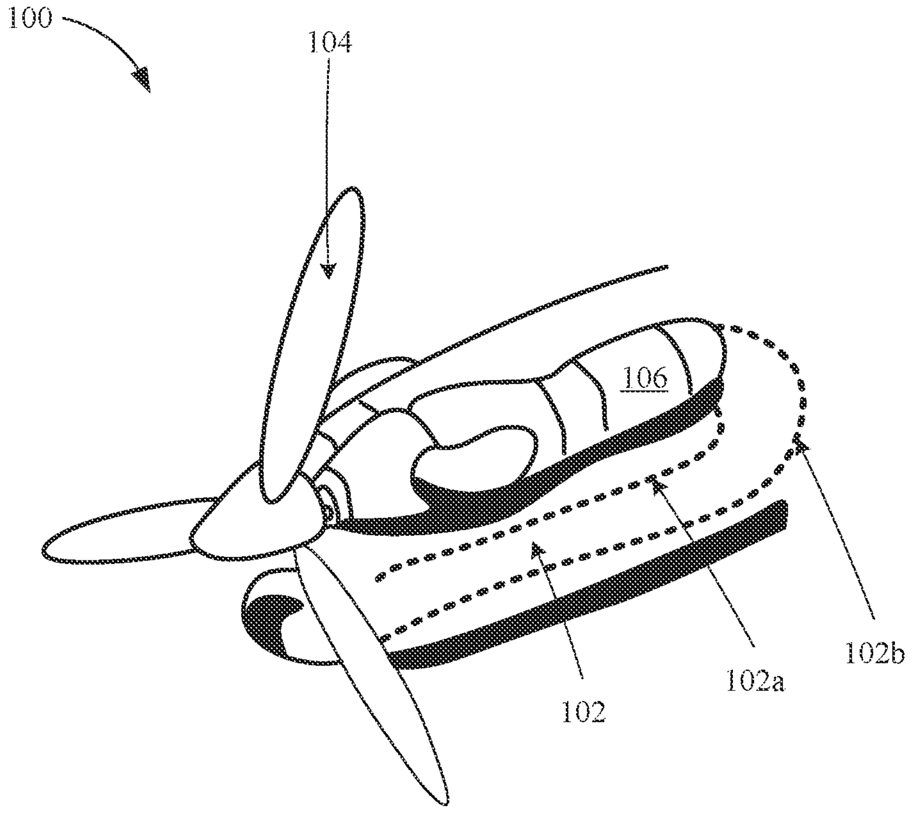
FIG. 1 illustrates a partial perspective view of an example axial flow turbomachine that receives a flow of air distorted by an example inlet.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing and/or assembly tolerances and/or other real world imperfections. As used herein, "substantially constrict" refers to a compression force that at least partially surrounds a perimeter of a structure(s) to tighten the perimeter of, or reduce a displacement between, the structure(s). As used herein "threadless" refers to a structure that does not include threads on a surface thereof.

DETAILED DESCRIPTION

A variable stator vane actuation system is disclosed herein. In general, variable stator vanes can be used to control the flow parameters of the air that flows inside a compressor of a turbomachine, such as, but not limited to, an aircraft engine, a turbojet, a turbofan, a marine gas turbine, an oil & gas pipeline compressor, an industrial gas turbine, etc. In some examples, variable stator vanes improve the efficiency of a turbomachine by controlling an angle of the flow of the air inside the compressor, and assures stable flow of the air, allowing to avoid surge and stall condition.

Traditionally, variable stator vane systems actuate all the vanes in each compressor stage (e.g., row of vanes arranged along a circumference of the compressor) according to a same schedule based on a speed and pressure of the air flowing into the compressor. In an example turbine engine for instance, all the variable stator vanes in a particular compressor stage can be moved together to a given angular position according to a same schedule.

However, in some examples, an inlet that transports the flow of air into the compressor distorts the incoming flow of air. For example, the inlet might have curved sides that cause the flow of air to have non-uniform speeds and/or pressures along a cross-section of the inlet.

Accordingly, examples disclosed herein enable actuating at least a first variable stator vane in a row of variable stator vanes of a compressor stage according to a first schedule and actuating at least a second variable stator vane of the same row of variable stator vanes according to a second schedule. In this way, for instance, variable stator vanes at different locations along a circumference of the compressor can be actuated to different vane angles to account for a non-uniformity of the air flow.

FIG. 1 illustrates a partial perspective view of an example axial flow turbomachine 100 that guides a flow of air through an example inlet 102. In the illustrated example of FIG. 1, the axial flow turbomachine 100 corresponds to an implementation of a reverse flow turboprop. As shown in the illustrated example of FIG. 1, the example axial flow turbomachine 100 includes the example inlet 102, an example propeller 104, and an example engine 106.

The example inlet 102 is a housing that guides a flow of air along a path illustrated by boundaries 102*a* and 102*b* into the example engine 106. In the illustrated example of FIG. 1, the example inlet 102 defines a curved path for the flow of air as indicated by the dashed lines of the boundaries 102*a* and 102*b*.

The example propeller 104 includes any propeller structure (e.g., a fan) that the example engine 106 rotates to induce the flow of air inside the example inlet 102.

The example engine 106 of the illustrated example of FIG. 1 is a gas turbine engine that receives the flow of air from the example inlet 102, compresses the received flow of air, and then uses the compressed air to operate a combustor and the power turbine to generate a torque that rotates the example propeller 104.

Figure 2:
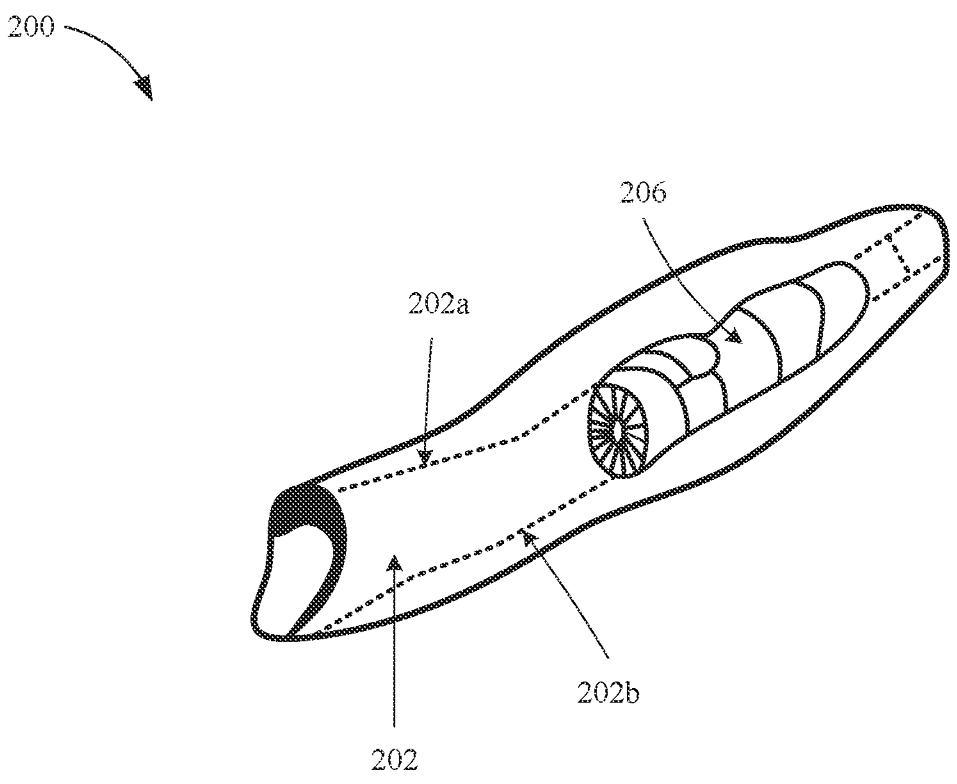
FIG. 2 illustrates a partial perspective view of an example axial flow turbomachine with a different example inlet having an alternative implementation to that of the example inlet of FIG. 1.

FIG. 2 illustrates a partial perspective view of another example axial flow turbomachine 200 with an alternative implementation of the example inlet 102 of FIG. 1. In the illustrated example of FIG. 2, the axial flow turbomachine 200 corresponds to an implementation of a turbofan. As shown in the illustrated example of FIG. 2, the example axial flow turbomachine 200 includes the example inlet 202 and an example engine 206.

The example inlet 202 includes any housing that guides a flow of air along a path illustrated by boundaries 202*a* and 202*b* into the example engine 206. As shown in the illustrated example of FIG. 2, the example inlet 202 defines a curved path for the flow of air as indicated by the example boundaries 202*a* and 202*b*.

The example engine 206 is a gas turbine engine that receives the distorted flow of air from the example inlet 202 (e.g., distorted due to the curved path bounded by the dashed lines 202*a* and 202*b* in the illustrated example of FIG. 2), compresses the received flow of air, and then uses the compressed air to operate a combustor (not shown) inside the example engine 206.

Figure 3A:
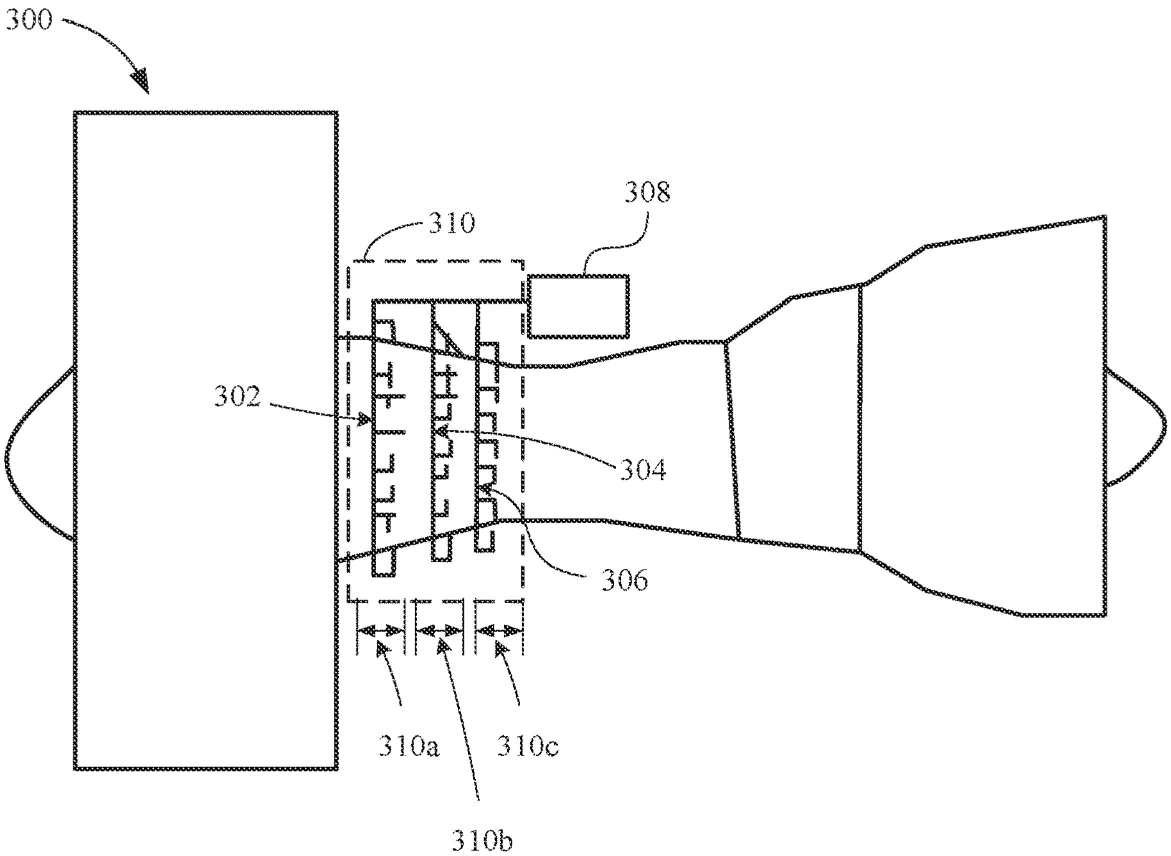
FIG. 3A illustrates an example axial flow turbomachine including example actuation rings used for controlling incidence angles of the variable stator vanes inside an example compressor of the example axial flow turbomachine.

FIG. 3A illustrates an example axial flow turbomachine 300 including example actuation rings 302, 304, 306 for controlling variable stator vanes (not shown) inside an example compressor 310 of the example axial flow turbomachine 300. The example axial flow turbomachine 300 of FIG. 3A includes an example implementation for a variable geometry system that can be used to compress the flow of air entering the example engines 106 and/or 206 of FIGS. 1-2, for example. In the illustrated example of FIG. 3A, the example axial flow turbomachine 300 includes the example actuation rings 302, 304, 306, an example actuator 308, and the example compressor 310.

Each of the example actuation rings 302, 304, and 306 include linkage structures that extend around the example compressor 310 at different sections (e.g., example compressor stages 310*a*, 310*b*, 310*c*). In general, the example actuation rings 302, 304, 306 (together with one or more other linkage structures) couple the example actuator 308 to the variable stator vanes (not shown) inside the example compressor 310. In the illustrated example of FIG. 3A, each of the example actuation rings 302, 304, 306 corresponds to a unison ring that extends (e.g., for 360 degrees) around the compressor 310 to form a closed ring.

The example actuator 308 receives a control signal and moves, based on the control signal, the variable stator vanes (not shown), coupled to the actuator 308 via the actuator rings 302, 304, 306, according to a particular schedule. For example, at time t=t0, all the vanes actuated by the actuator 308 may be moved to a "closed" position that corresponds to a particular vane angle. To that end, the actuator 308 includes any type of actuator, such as an electrical actuator, a hydraulic actuator, a pneumatic actuator, among other examples.

The example compressor 310 compresses air flowing inside the compressor 310 by guiding the air through the example compressor stages 310*a*, 310*b*, and 310*c*, in that order. Thus, each of the compressor stages 310*a*, 310*b*, 310*c* corresponds to a respective section of the example compressor 310. In some examples, cross-sectional dimensions of the compressor stage 310*b* is smaller than that of the compressor stage 310*a*, and a cross-section of the stage 310*c* is smaller than that of the stage 310*b*. In this way, the air flowing through the compressor 310 may be compressed as it flows from one stage to a subsequent stage.

Figure 3B:
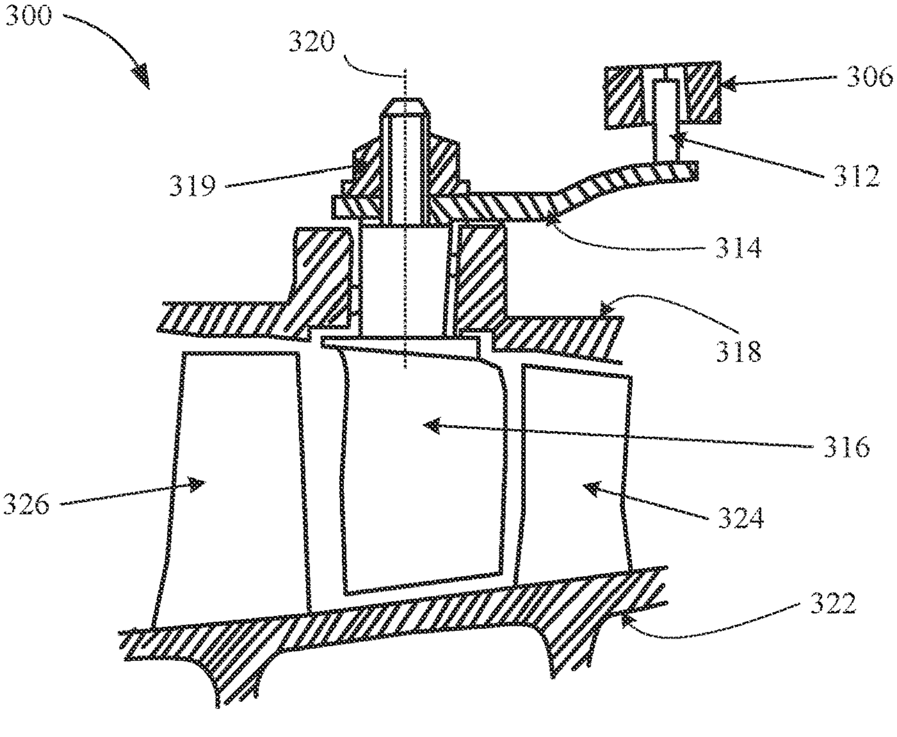
FIG. 3B is a partial cross-sectional view illustration of the example axial flow turbomachine 300 of FIG. 3A.

FIG. 3B is a partial cross-sectional view illustration of the example axial flow turbomachine 300 of FIG. 3A. In the cross-sectional view illustration of FIG. 3B, the example actuation ring 306 extends through the page. As shown in the illustrated example of FIG. 3A, the example axial flow turbomachine 300 also includes an example lever pin 312, an example lever 314, an example vane 316, an example casing 318, an example nut 319, an example compressor rotor 322, and example rotor blades 324, 326.

The example lever pin 312 is a linkage structure that transfers an actuation motion (e.g., induced by the example actuator 308 of FIG. 3A) from the example actuation ring 306 to the example lever 314. For example, the lever pin 312 could pivot the lever 310 (relative to the ring 306) to a particular position based on the control signal operating the actuator 308.

The example lever 314, in turn, is a linkage structure that transfers the actuation motion from the example lever pin 312 the example vane 316.

The example vane 316 is coupled to the example casing 318 (of the compressor 310) at a given position along a circumference of the compressor 310. In the illustrated example of FIG. 3B, the example vane 316 is configured to pivot about a pivot axis 320 to a particular vane angle defined by the control signal operating the actuator 308. By way of example, a first vane angle may be associated with an "open" configuration of the vane 316, and a second vane angle may be associated with a "closed" configuration of the vane 316.

The casing 318 includes any solid structure (e.g., wall, etc.) surrounding the compressor 310 and/or any portion of the turbomachine 300. For example, variable stator vanes (e.g., the example vane 316) disposed inside the compressor 310 could be coupled to the casing 318 in a circumferential arrangement. The example nut 319 couples the example lever 314 to the example vane 316.

The example compressor rotor 322 is a compressor rotor that rotates the example rotor blades 324 and 326 to accelerate the air flowing inside the compressor 310 toward a subsequent compressor stage (and/or toward a combustor or other component of the turbomachine 300 that receives compressed air from the compressor 310).

To that end, the example rotor blades 324 and 326 include airfoils and/or any other type of structure configured to accelerate and/or add energy into the flow of air, together with the variable stator vanes of the compressor 310, by rotating about a rotor axis (not shown) of the compressor 310.

Figure 4:
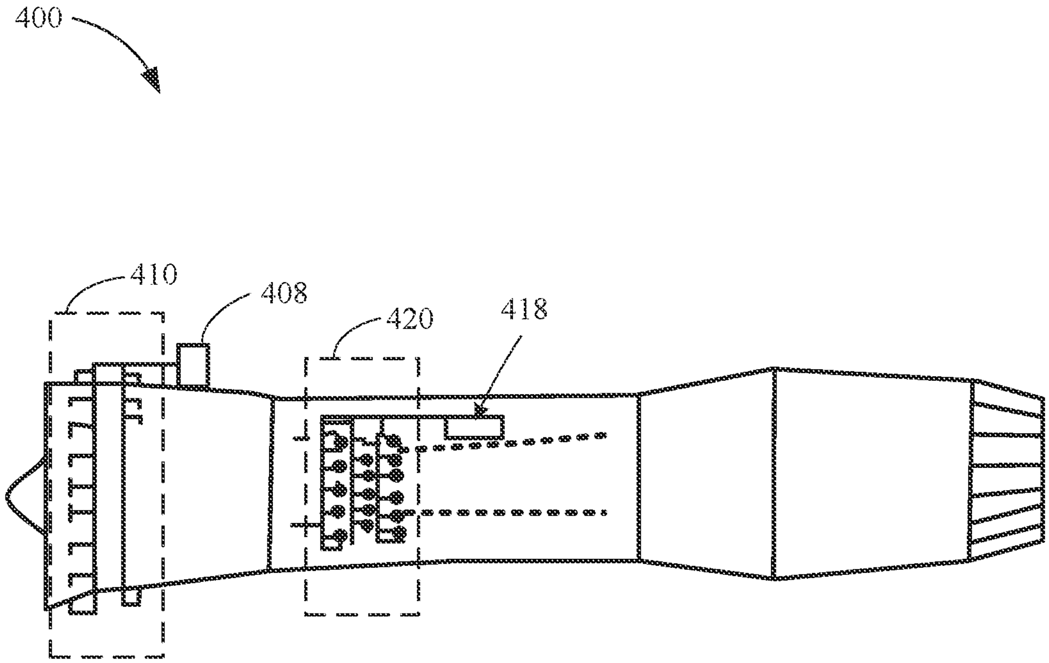
FIG. 4 illustrates an example axial flow turbomachine that includes an example low-pressure compressor and an example high-pressure compressor.

FIG. 4 illustrates an example axial flow turbomachine 400 that includes an example low-pressure compressor 410 and an example high-pressure compressor 420. In the illustrated example of FIG. 4, the example axial flow turbomachine 400 includes a first example actuator 408, the example low-pressure compressor 410, a second example actuator 418, and the example high-pressure compressor 420. The example turbomachine 400 of the illustrated example of FIG. 4 represents an alternative turbomachine implementation to the implementation of the example turbomachine 300 of FIGS. 3A and 3B. For example, as shown in FIG. 4, the example turbomachine 400 includes multiple compressors 410 and 420.

In the illustrated example of FIG. 4, actuator 408 controls the positions of all the vanes (not shown) in one or more compressor stages of the example low-pressure compressor 410. Further, in the illustrated example of FIG. 4, the second example actuator 418 controls the position of all the vanes (not shown) in one or more compressor stages of the example high-pressure compressor 420.

Figure 5:
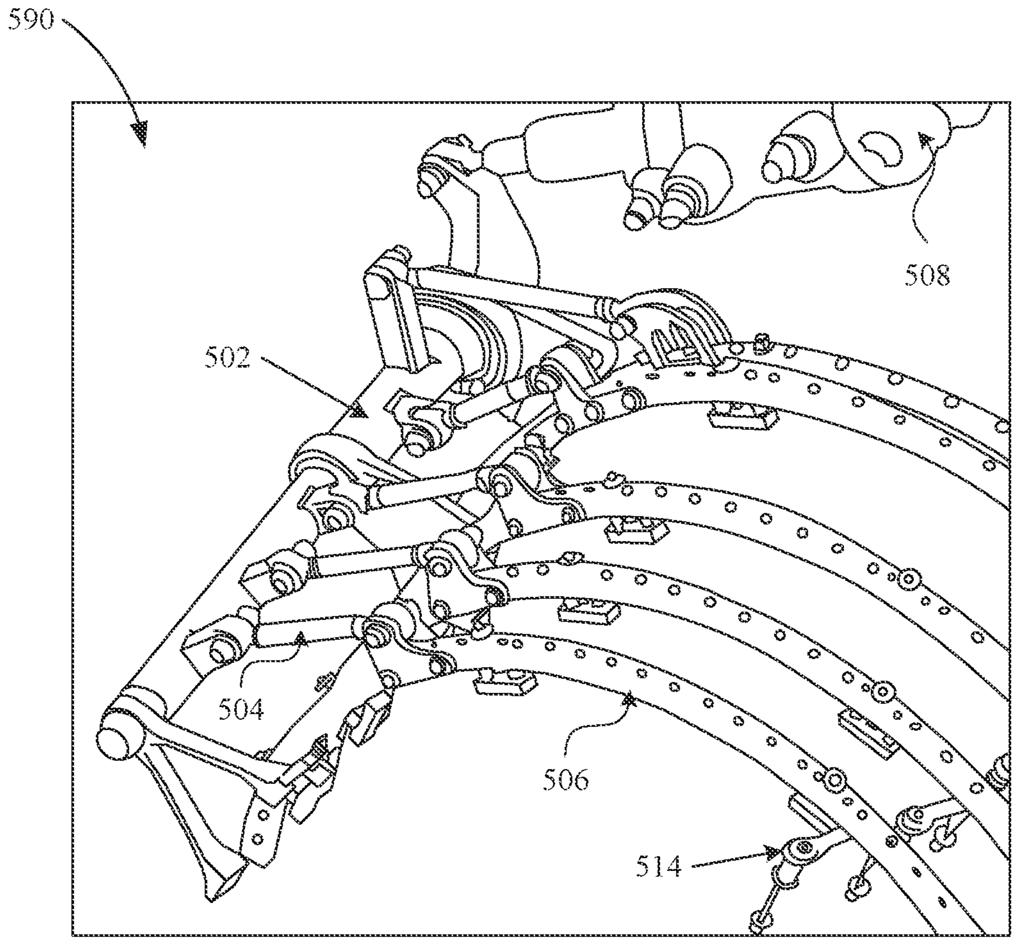
FIG. 5 illustrates a partial perspective view of an example actuation system for actuating variable stator vanes.

FIG. 5 illustrates a partial perspective view of an example actuation system 590 for actuating variable stator vanes in any of the example turbomachines 100, 200, 300, and/or 400 of FIGS. 1-4. In the illustrated example of FIG. 5, the example actuation system 590 includes an example torque shaft 502, an example link 504, an example actuation ring 506, example actuator 508, and an example lever 514.

The example torque shaft 502 is a linkage structure that transfers an actuation motion (e.g., schedule, etc.) induced by the example actuator 508 to one or more links, exemplified by link 504. The link 504, in turn, is a linkage structure that transfers the actuation motion from the torque shaft 502 to one or more actuation rings, such as the actuation ring 506.

In some examples, the actuation ring 506 may be similar to any of the actuation rings 302, 304, 306 of FIG. 3A. For example, although not shown in the illustrated example of FIG. 5, the actuation ring 506 can include a unison ring that extends around a compressor (not shown) to form a closed ring. In alternative examples, the actuation ring 506 includes a split ring structure (e.g., a ring having a gap or opening) that does not extend to form a closed ring shape.

The example actuator 508 is similar to any of the example actuators 308, 408, and/or 418 (e.g., hydraulic actuator, electrical actuator, etc.). By way of example, the actuator 508 may receive a control signal and then move, based on the control signal, a vane (not shown) that overlaps the example lever 514 in line with the discussion in the description of FIG. 3B. To that end, the lever 514 may be similar to the lever 314 of FIG. 3B.

Figure 6A:
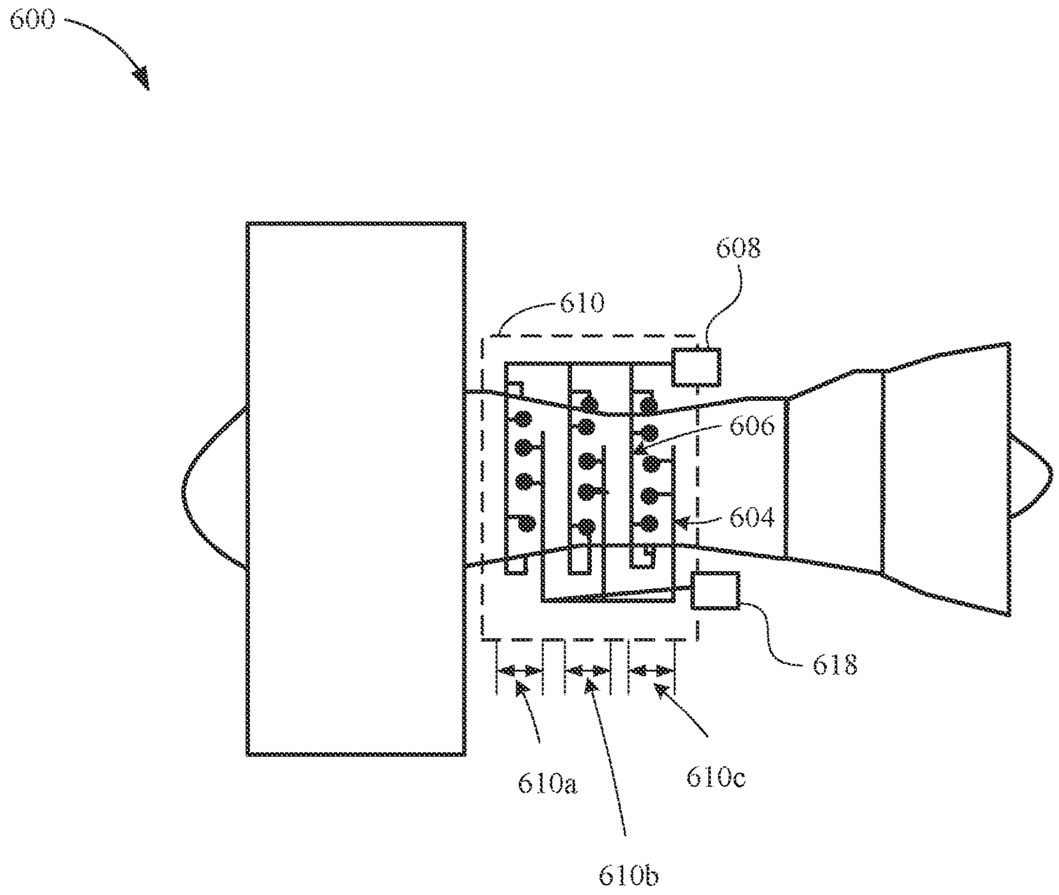
FIG. 6A illustrates an example axial flow turbomachine including example split actuation rings for controlling variable stator vanes inside an example compressor of the example axial flow turbomachine.

FIG. 6A illustrates an example axial flow turbomachine 600 including example split actuation rings 604, 606 for controlling variable stator vanes inside an example compressor 610 of the example axial flow turbomachine 600. For example, the example axial flow turbomachine 600 represents an alternative implementation of the example axial flow turbomachines 300 and 400 of FIGS. 3-4 including the example split actuation rings 604, 606. In the illustrated example of FIG. 6A, the example axial flow turbomachine 600 includes example actuation rings 604 and 606, example actuators 608 and 618, and the example compressor 610.

The example actuation rings 604 and 606 are linkage structures extending around respective portions of a circumference of the example compressor 610. Thus, in the illustrated example of FIG. 6A, the example actuation rings 604 and 606 are split rings that extend for less than 360 degrees around the example compressor 310.

The example actuators 608 and 618 include any type of actuator (e.g., hydraulic actuators, electrical actuators, etc.). In the illustrated example of FIG. 6A, each of the example actuators 608 and 618 drives a different set of vanes in the example compressor stage 610*c*. Thus, for instance, the example actuator 608 can drive a first vane (not shown), via the actuation split ring 606, according to a first schedule. Additionally, for instance, the example actuator 618 can drive a second vane (not shown), via the actuation split ring 604, according to a second schedule. To that end, in some examples, the example actuator 608 receives a first control signal associated with the first schedule and the example actuator 610 receives a second control signal associated with the second schedule.

The example compressor 610 includes a series of compressor stages 610*a*, 610*b*, and 610*c*. Each of the compressor stages 610*a*, 610*b*, 610*c* corresponds to a section of the compressor 610. At each of the compressor stages 610*a*, 610*b*, and 610*c*, one or more variable stator vanes (not shown) are actuated (via a first assembly of linkages including the split ring 606) by the first example actuator 608, and one or more other variable stator vanes (not shown) are actuated (via a second assembly of linkages including the split ring 604) by the second example actuator 618.

Figure 6B:
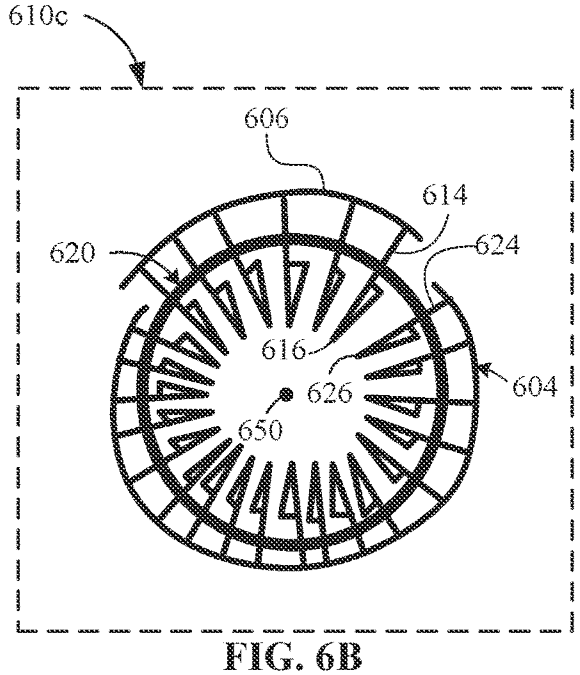
FIG. 6B illustrates a partial cross-section view of an example compressor stage of the example compressor of FIG. 6A.

FIG. 6B illustrates a partial cross-section view of the example compressor stage 610*c* of FIG. 6A. The illustrated example of FIG. 6B represents a cross-section of a portion of the example compressor stage 610*c* of the illustrated example of FIG. 6A.

It is noted that the example axial flow turbomachine 600 may include one or more additional components (e.g., compressor rotor, compressor rotor blades, etc.) that are omitted from the illustration of FIG. 6B for convenience in description. Additionally, portions of one or more components (e.g., the example actuation rings 604 and/or 606) of the example axial flow turbomachine 600 are projected onto the cross-sectional view illustration of FIG. 6B for convenience in description.

As shown in the illustrated example of FIG. 6B, the example axial flow turbomachine 600 also includes a plurality of variable stator vanes, exemplified by example vanes 616 and 626. Further, as shown in FIG. 6B, the example axial flow turbomachine 600 also includes example levers 614 and 624, and an example casing 620.

In the illustrated example of FIG. 6B, the plurality of variable stator vanes, including the example vanes 616 and 626, are arranged along a circumference of the example casing 620. Thus, in the illustrated example of FIG. 6B, the plurality of variable stator vanes (e.g., vanes 616, 626, etc.) correspond to a row of variable stator vanes in the example compressor stage 610*c*. One or more of the example vanes 616 and 626 (and/or other variable stator vanes of the compressor stage 610*c*) may be similar to the example vane 316 of FIG. 3B. Each of the example vanes 616 and 626 is configured to pivot about a respective pivot axis (not shown), similar to the pivot axis 320 of FIG. 3B for example, that extends radially toward a center axis 650 of the compressor 310, and/or that extends in a substantially perpendicular direction (e.g., 90+/−5 degrees, etc.) relative to the example casing 620. In the illustrated example of FIG. 6B the center axis 650 of the coextends through the page (and through a center of the example compressor stages 610*a* and 610*b* of FIG. 6A).

Each of the example levers 614 and 624 is a linkage structure (e.g., similar to the example lever 314 of FIG. 3B). In the illustrated example of FIG. 6B, the example lever 614 couples the example vane 616 to the example actuation ring 606, and the example lever 624 couples the example vane 626 to the example actuation ring 604. In this way, for example, the example actuator 608 can actuate the first example vane 616 (via a first assembly of linkage structures including the example actuation ring 606) according to a first schedule, and the example actuator 618 can actuate the second example vane 626 (via a second assembly of linkage structures including the example actuation ring 604) according to a second schedule. For example, although FIG. 6B shows the example vanes 616 and 626 to have a similar vane angle, the example axial turbomachine 600 can alternatively pivot the example vane 616 (e.g., via the example actuator 608) to a different vane angle than a vane angle of the example vane 626.

The example casing 620 may be similar to the casing 318 of FIG. 3B. For example, the example vanes 616 and 626 are disposed inside the example casing 620 and are actuated, respectively, via the example levers 614 and 624.

Figure 6C:
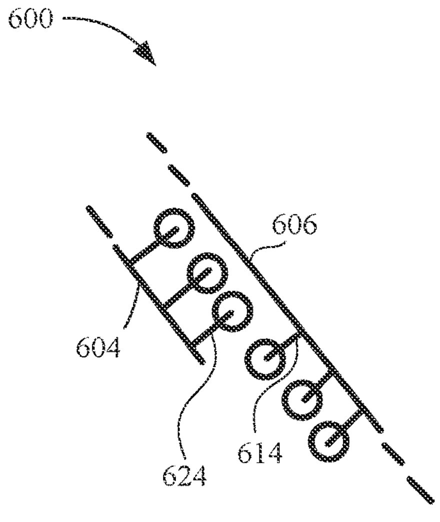
FIG. 6C illustrates a magnified partial side view of the example axial flow turbomachine of FIG. 6A.

FIG. 6C illustrates a magnified partial side view of a portion of the example axial flow turbomachine 600 of FIG. 6A. In some examples, the example lever 614 pivots the example vane 616 of FIG. 6B about a first pivot axis (e.g., similar to the pivot axis 320 of FIG. 3B), and the example lever 624 pivots the example vane 626 of FIG. 6B about a second pivot axis. In the illustrated example of FIG. 6C, the first pivot axis and the second pivot axis extend through the page (e.g., toward the center axis 650 of FIG. 6B and/or toward the casing 620 of FIG. 6B).

Thus, in the arrangement of FIGS. 6A-6C, the first example actuator 608 of FIG. 6A can actuate the first example vane 616 of FIG. 6B according to a first schedule via a first assembly of linkages including the example actuation ring 606 and the example lever 614. Further, with this arrangement, the second example actuator 618 of FIG. 6A can actuate the second example vane 626 of FIG. 6B according to a second schedule (different than the first schedule) via a second assembly of linkages including the example actuation ring 604 and the example lever 624. For example, the first example actuator 608 can actuate (e.g., via linkages including the ring 606, the lever 614, etc.) the vane 616 to a first vane angle v1 at a time t=t1. The time t1 and the angle v1 may be indicated by the first schedule, for instance. Additionally, in this example, the second example actuator 618 can actuate (e.g., via linkages including the ring 604, the lever 624, etc.) the vane 626 to a second different vane angle v2 at time t=t2 (e.g., based on the second schedule).

Although the example turbomachine 600 in the illustrated examples of FIGS. 6A-6C is shown to includes split actuation rings 604 and 606, in other examples, the example turbomachine 600 alternatively or additionally includes a unison actuation ring (e.g., closed ring structure extending around compressor 310), such as any of the actuation rings 302, 304 and/or 306 of FIG. 3A, to couple an actuator (e.g., actuator 608 and/or 618) to one or more variable stator vanes in one or more of the compressor stages 610*a*, 610*b*, and/or 610*c*.

Figure 7A:
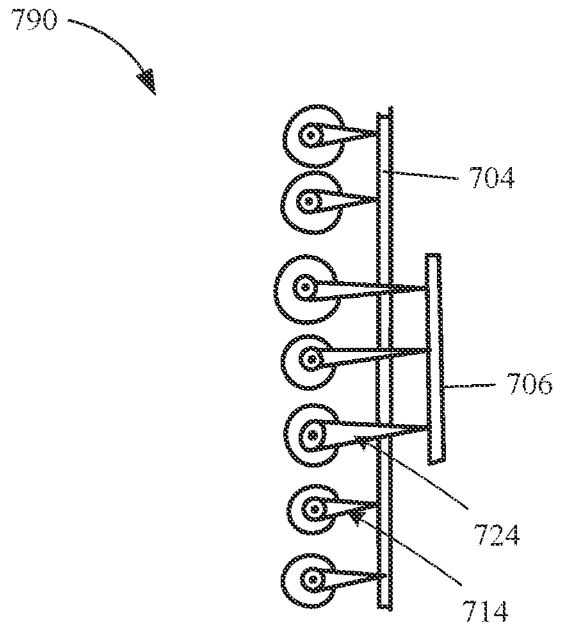
FIG. 7A illustrates a partial side view of a first example actuation system including at least two example split actuation rings for actuating a first set of vanes in a row of variable stator vanes according to a first schedule and actuating a second set of vanes in the same row of variable stator vanes according to a second schedule.

FIG. 7A illustrates a partial side view of a first example actuation system 790 including at least two example actuation rings 704, 706 for actuating a first group of vanes (not shown) in a row of variable stator vanes (not shown) according to a first schedule and actuating a second set of vanes (not shown) in the same row of variable stator vanes according to a second schedule. In some examples, the example actuation system 790 can be used in addition to or instead of one or more components of the example axial flow turbomachine 600 of FIGS. 6A-6C. To that end, the partial side view illustration of FIG. 7A may be similar to the partial side view illustration of FIG. 6C.

In the illustrated example of FIG. 7A, the first example actuation system 790 includes the example actuation rings 704 and 706, and a plurality of levers exemplified by example levers 714 and 724. The example lever 714 transfer actuation motions from the example actuation ring 704 to a first variable stator vane (not shown). The example lever 724 is to transfer actuation motions from the example actuation ring 706 to a second variable stator vane (not shown).

The example actuation rings 704 and 706 may be similar, respectively, to the example actuation rings 604 and 606 of FIGS. 6A-6C. For example, the example actuation ring 704 may include a split ring (or unison ring) linkage structure that transfers an actuation motion (e.g., from the first example actuator 608, etc.) to a first group of variable stator vanes in a particular compressor stage (e.g., compressor stage 610*c*). Further, the example actuation ring 706 may include a split ring (or unison ring) linkage structure that transfers a different actuation motion (e.g., from the second actuator 618, etc.) to a second group of variable stator vanes in the same particular compressor stage.

To facilitate the transfer of actuation motion, the plurality of levers in the illustrated example of FIG. 7A include a first group of levers (exemplified by the example lever 714) extending from the first example actuation ring 704 to the first group of variable stator vanes (not shown), and a second group of levers (exemplified by the example lever 724) extending from the second example actuation ring 706 to the second group of variable stator vanes (not shown). Further, in the illustrated example of FIG. 7A, the first example actuation ring 704 is disposed between the second example actuation ring 706 and a row of variable stator vanes (not shown) coupled to respective levers of the levers 714, 724, etc. For example, as shown in FIG. 7A, the example lever 714 extends away from the example actuation ring 704 in a given direction, and the example lever 724 extends away from the example actuation ring 706 in the same given direction.

Figure 7B:
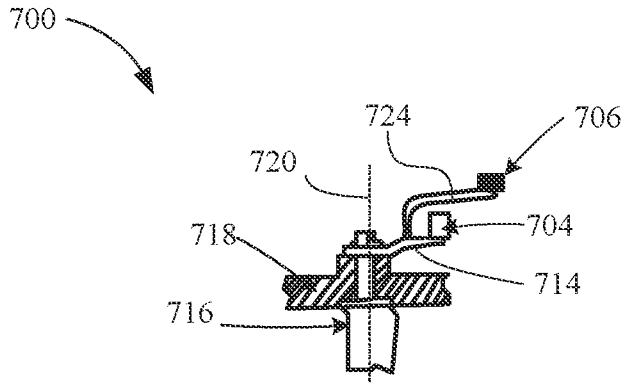
FIG. 7B illustrates a partial cross-section view of an example turbomachine that includes the first example actuation system of FIG. 7A.

FIG. 7B illustrates a partial cross-section view of an example turbomachine 700 that includes the first example actuation system 790 of FIG. 7A. The example turbomachine 700 may be similar to the example turbomachine 600 of FIGS. 6A-6C, for example. Further, the partial cross section view of FIG. 7B may be similar to the partial cross-section view of FIG. 3B. For instance, in the illustrated example of FIG. 7B, the example actuation rings 704 and 706 extend through the page.

In the illustrated example of FIG. 7B, the example turbomachine 700 includes an example variable stator vane 716 and an example casing 718 that are similar, respectively, to the example vane 616 and the example casing 620 of FIG. 6B. By way of example, the example variable stator vane 716 corresponds to a first variable stator vane of a row of variable stator vanes in a same compressor stage (e.g., the compressor stage 610*c*). In this example, the turbomachine 700 pivots the example variable stator vane 716 about pivot axis 720 according to a first schedule based on actuation motions transferred to the example vane via a first assembly of linkages including the example lever 714 and the example actuation ring 704. Further, in this example, the turbomachine 700 pivots a second vane (not shown) of the row of variable stator vanes about a second pivot axis (not shown) according to a second schedule based on actuation motions transferred to the second vane via a second assembly of linkages including at least the example lever 724 and the example actuation ring 706.

To that end, in the illustrated examples of FIGS. 7A and 7B, the first assembly of linkages (including at least the example lever 714 and the example actuation ring 704) used to actuate the first example variable stator vane 716 is kinematically separate from the second assembly of linkages (including at least the example lever 724 and the example actuation ring 706) used to actuate the second vane (not shown) in the same row of variable stator vanes as the first example variable stator vane 716.

Figure 8A:
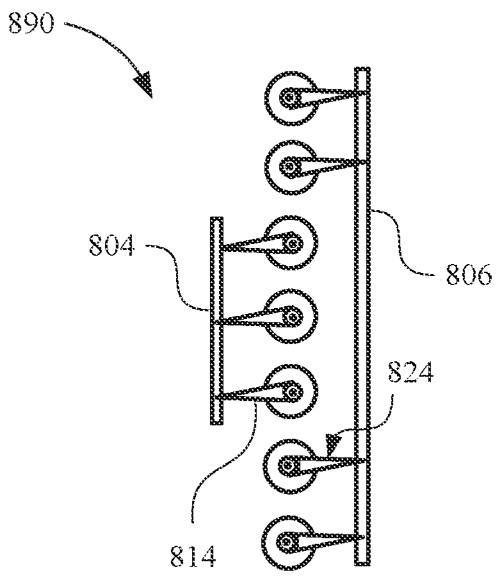
FIG. 8A illustrates a partial side view of a second example actuation system including at least two example split actuation rings constructed in accordance with teachings in this disclosure.

FIG. 8A illustrates a partial side view of a second example actuation system 890 including at least two example actuation rings 804, 806 to actuate a first group of vanes (not shown) in a row of variable stator vanes (not shown) according to a first schedule and to actuate a second set of vanes (not shown) in the same row of variable stator vanes according to a second schedule. In some examples, the example actuation system 890 can be used in addition to or instead of one or more components of the example axial flow turbomachine 600 of FIGS. 6A-6C. To that end, the partial side view illustration of FIG. 8A may be similar to the partial side view illustration of FIG. 6C.

In the illustrated example of FIG. 8A, the second example actuation system 890 includes the example actuation rings 804 and 806 that are similar, respectively, to the example actuation rings 604 and 606 of the example turbomachine 600. Further, in the illustrated example of FIG. 8A, the example actuation system 890 includes example levers 814 and 824 that are similar, respectively, to the example levers 614 and 624 of the example turbomachine 600.

In the illustrated example of FIG. 8A, the example lever 814 extends away from the example actuation ring 804 in a first direction, and the example lever 824 extends away from the example actuation ring 806 in a different second direction.

Figure 8B:
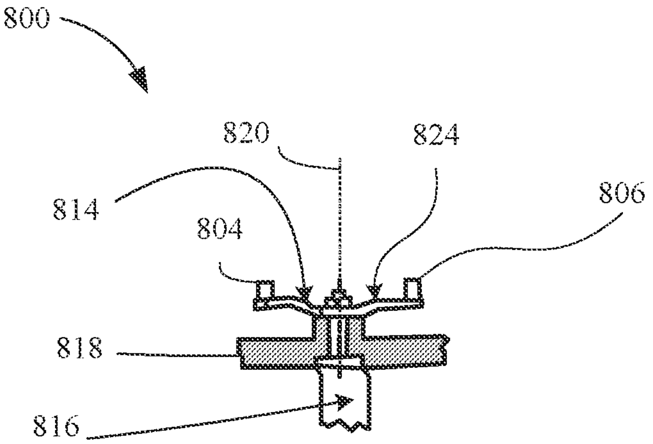
FIG. 8B illustrates a partial cross-section view of an example turbomachine that includes the second example actuation system of FIG. 8A.

FIG. 8B illustrates a partial cross-section view of an example turbomachine 800 that includes the example actuation system 890 of FIG. 8A. The example turbomachine 800 may be similar to the example turbomachine 600 of FIGS. 6A-6C, for example. Further, the partial cross section view of FIG. 8B may be similar to the partial cross-section view of FIGS. 3B and 7B. For instance, in the illustrated example of FIG. 8B, the example actuation rings 804 and 806 extend through the page.

In the illustrated example of FIG. 8B, the example turbomachine 800 includes an example variable stator vane 816, an example casing 818, and an example pivot axis 820 that are similar, respectively, to the example variable stator vane 716, the example casing 718, and the example pivot axis 720 of FIG. 7B.

In the illustrated examples of FIGS. 8A and 8B, a first assembly of linkages (including at least the example lever 814 and the example actuation ring 804) used to actuate the first example variable stator vane 816 is kinematically separate from a second assembly of linkages (including at least the example lever 824 and the example actuation ring 806) used to actuate a second vane (not shown) in a same row of variable stator vanes as the first example variable stator vane 816.

Figure 9A:
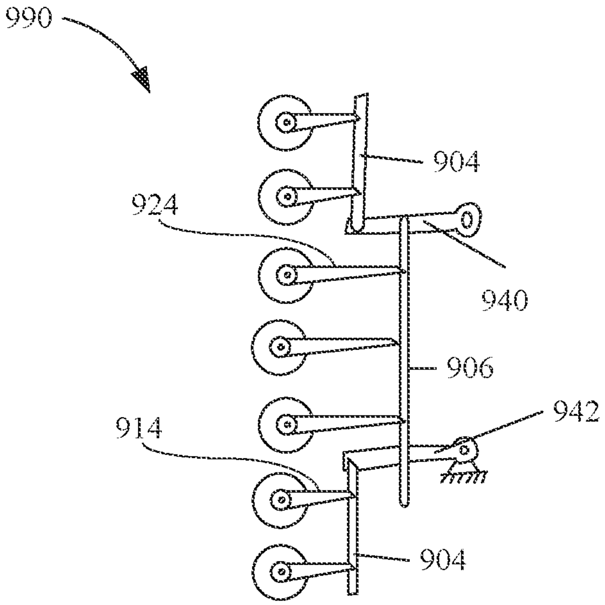
FIG. 9A illustrates a partial side view of a third example actuation system including at least two example split actuation rings constructed in accordance with teachings in this disclosure.

FIG. 9A illustrates a partial side view of a third example actuation system 990 including at least two example actuation rings 904, 906 for actuating a first group of vanes (not shown) in a row of variable stator vanes (not shown) according to a first schedule and actuating a second set of vanes (not shown) in the same row of variable stator vanes according to a second schedule. In some examples, the example actuation system 990 can be used in addition to or instead of one or more components of the example axial flow turbomachine 600 of FIGS. 6A-6C. To that end, the partial side view illustration of FIG. 9A may be similar to the partial side view illustration of FIG. 6C.

In the illustrated example of FIG. 9A, the example actuation system 990 includes the example actuation rings 904 and 906, a plurality of levers exemplified by example levers 914 and 924, and example links 940 and 942.

In some examples, the example actuation rings 904 and 906 may be similar, respectively, to the example actuation rings 604 and 606 of FIGS. 6A-6C. For example, the example actuation ring 904 may include a split ring (or unison ring) linkage structure that transfers an actuation motion (e.g., from the first example actuator 608, etc.) to a first group of variable stator vanes in a particular compressor stage (e.g., compressor stage 610*c*). Further, in this example, the example actuation ring 906 may include a split ring (or unison ring) linkage structure that transfers a different actuation motion (e.g., from the second actuator 618, etc.) to a second group of variable stator vanes in the same particular compressor stage.

To facilitate this, the plurality of levers in the illustrated example of FIG. 9A include a first group of levers (exemplified by the example lever 914) extending from the first example actuation ring 904 to the first group of variable stator vanes (not shown), and a second group of levers (exemplified by the example lever 924) extending from the second example actuation ring 906 to the second group of variable stator vanes (not shown).

Additionally or alternatively, in some examples, a single actuator can be used to actuate the first group of variable stator vanes coupled to the first example actuation ring 904) and the second group of variable stator vanes coupled to the second example actuation ring 906. To facilitate this, the example links 940 and 942 could transfer actuation motions induced by the single actuator: from the example actuation ring 904 to the example actuation ring 906, or from the example actuation ring 906 to the example actuation ring 904. For example, the shape and/or structure of the example links 940 and/or 942 (and/or the second group of levers including the example lever 924) could induce an offset between first vane angles of the first group of variable stator vanes coupled to the example actuation ring 904 and second vane angles of the second group of variable stator vanes coupled to the example actuation ring 906.

Each of the example links 940 and 942 includes any linkage structure configured to translate an actuation motion from the actuation ring 904 to the actuation ring 906 (and/or from the actuation ring 906 to the actuation ring 904). In some examples, the example link 940 and 942 kinematically couple the example actuation rings 904 and 906 even if each ring is coupled to a different actuator. For example, a first actuator (e.g., the example actuator 608) coupled to the actuation ring 904 could actuate the first group of vanes coupled to the actuation ring 904 (e.g., via lever 914, etc.) by pivoting the first group of vanes to a first vane angle, and the first actuator could also actuate the second group of vanes coupled to the ring 960 (e.g., via links 940, 942 and lever 924, etc.) to a second (different) vane angle. Additionally or alternatively, for example, a second actuator (e.g., actuator 618, etc.) can also induce different movements to the first group of vanes (e.g., via the links 940, 942 and the lever 914, etc.) than the second group of vanes (e.g., via the lever 924, etc.). More generally, the example links 940 and 942 kinematically couple the first group of variable stator vanes actuated according to a first schedule and the second group of variable stator vanes actuated according to a second schedule.

Figure 9B:
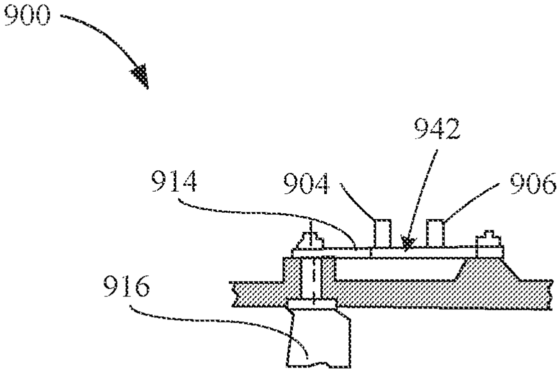
FIG. 9B illustrates a partial cross-section view of an example turbomachine that includes the second example actuation system of FIG. 9A.

FIG. 9B illustrates a partial cross-section view of an example turbomachine 900 that includes the example actuation system 990 of FIG. 9A. The example turbomachine 900 may be similar to the example turbomachine 600 of FIGS. 6A-6C, for example. Further, the partial cross section view of FIG. 9B may be similar to the partial cross-section view of FIG. 3B. For instance, in the illustrated example of FIG. 9B, the example actuation rings 904 and 906 extend through the page.

In the illustrated example of FIG. 9B, the example turbomachine 900 includes an example variable stator vane 916 that is similar to the example vane 616 of FIG. 6B. By way of example, the example variable stator vane 916 corresponds to a first variable stator vane in a row of variable stator vanes of a same compressor stage (e.g., the compressor stage 610*c*). In this example, the turbomachine 900 pivots the example variable stator vane 916 about a pivot axis (e.g., similar to pivot axes 720 and/or 820) according to a first schedule based on actuation motions transferred to the example variable stator vane 916 via an assembly of linkages including the example lever 914, the example actuation ring 904, the example link 940, and the example actuation ring 906.

To that end, in the illustrated examples of FIGS. 9A and 9B, the assembly of linkages (including at least the example lever 914) used to actuate the example variable stator vane 916 according to the first schedule is kinematically coupled to both the example actuation ring 904 and the example actuation ring 906. Further, the second vane (not shown) of the same row of variable stator vanes as the example variable stator vane 916 is kinematically coupled to the example variable stator vane 916 (e.g., via the 940 and 942, etc.) but is actuated according to the second (different) schedule.

Figure 10:
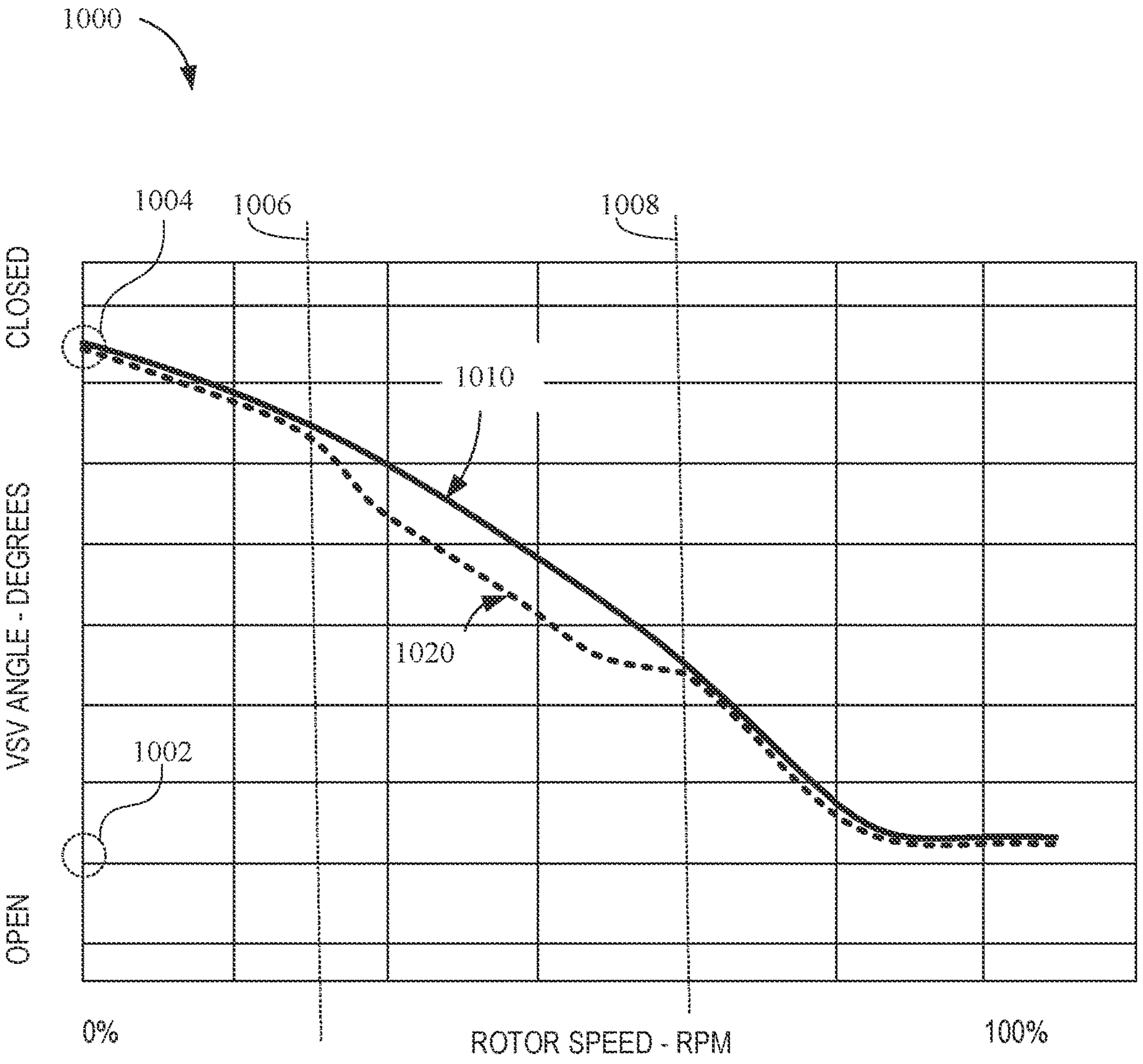
FIG. 10 is a graph illustration of relationships between vane angles and rotor speeds in an example variable geometry system associated with two different schedules, in accordance with teachings in this disclosure.

FIG. 10 is a graph illustration 1000 of relationships between vane angles and rotor speeds in an example variable geometry system associated with two different schedules, in accordance with teachings in this disclosure. In the illustrated example of FIG. 10, a first schedule 1010 assigns vane angles (e.g., between angles 1002 and 1004) to a range of rotor speeds (e.g., rotor speeds of a compressor rotor such as the example compressor rotor 322 of FIG. 3B), and a second schedule 1020 assigns different vane angles to the range of rotor speeds. In the graph illustration 1000, the angle 1002 may correspond to a vane angle at which a vane is in an "open" vane position. Further, the angle 1004 may correspond to a "closed" vane position.

Thus, in an example scenario, a first group of variable stator vanes (e.g., the vane 616 and other vanes coupled to the example actuation ring 606 in the illustrated example of FIG. 6B) in a compressor stage (e.g., the example compressor stage 610*c*) is actuated according to the first schedule 1010, and a second group of variable stator vanes (e.g., the vane 626 and other vanes coupled to the example actuation ring 604 in the illustrated example of FIG. 6B) in the same compressor stage is actuated according to the second schedule 1020. In this example, as shown in FIG. 10, the first group of vanes associated with the first schedule 1010 can be actuated to different vane angles than the second group of vanes when the rotor speed is within the range of rotor speeds between a first rotor speed 1006 and a second rotor speed 1008.

Figure 11:
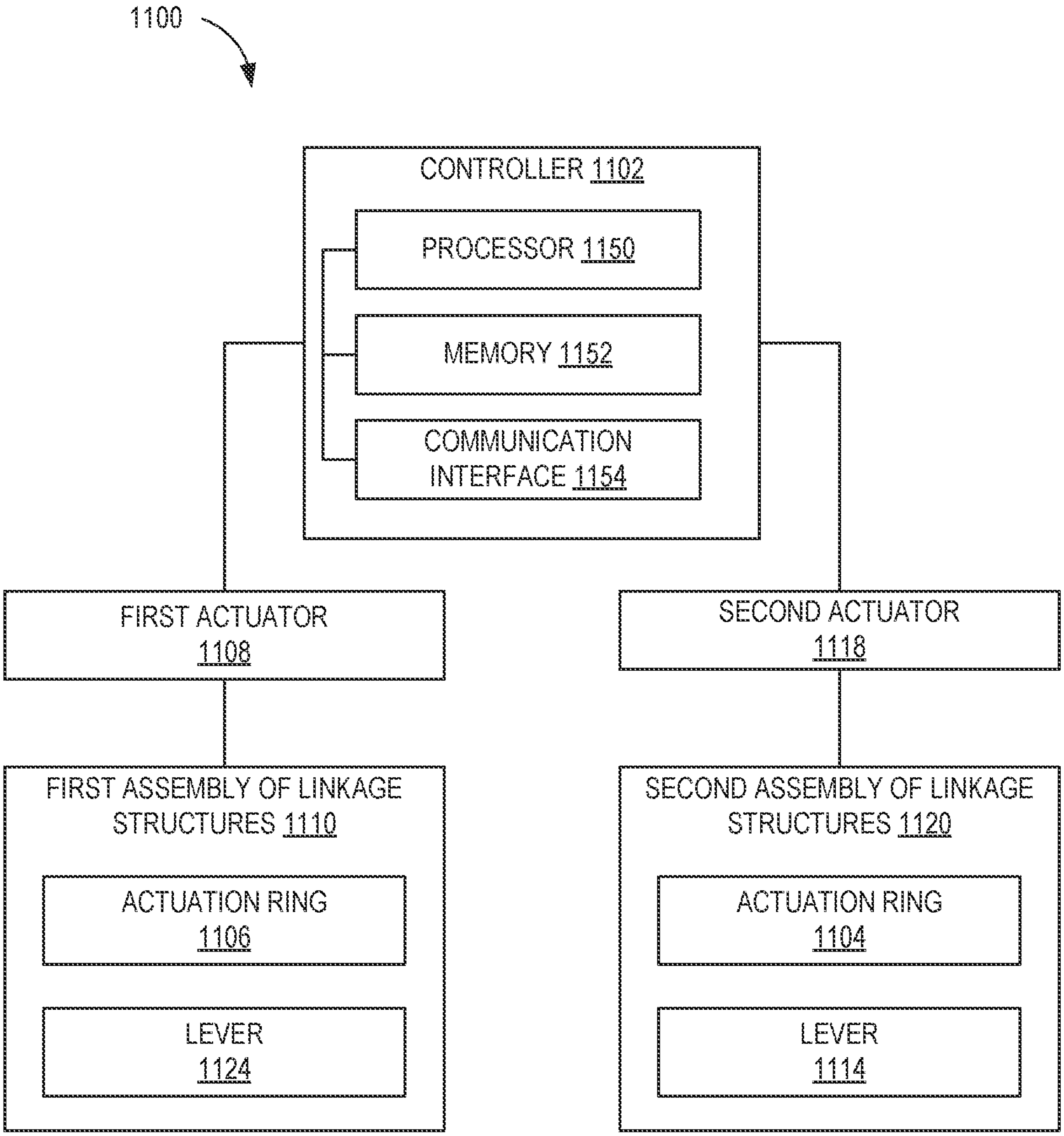
FIG. 11 is a block diagram of an example actuation system that can be used with the example axial flow turbomachine of FIGS. 6A-6C.

FIG. 11 is a block diagram of an example actuation system 1100 that can be used with the example axial flow turbomachine 600 of FIGS. 6A-6C. In the illustrated example of FIG. 11, the example actuation system 1100 includes an example controller 1102, a first example actuator 1108, a second example actuator 1118, a first example assembly of linkage structures 1110, and a second example assembly of linkage structures 1120.

The example controller 1102 (e.g., "Engine Control Unit") includes any combination of hardware, firmware, and/or software to provide a first control signal to the first example actuator 1108 and a second control signal to the second example actuator 1118. The example controller 1102 could be implemented using any combination of one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In the illustrated example of FIG. 11, the example controller 1102 includes an example processor 1150, an example memory 1152, and an example communication interface 1154.

The example processor 1150 can be implemented by one or more integrated circuits, logic circuits, microprocessors, GPUs, DSPs, or controllers from any desired family or manufacturer. The processor 1150 may be a semiconductor based (e.g., silicon based) device.

The example memory 1152 includes any type of data storge and/or memory implementation, such as volatile memory, non-volatile memory, etc. Example volatile memory implementations include Synchronous Dynamic Random Access Memory (SDRAM), Dynamic Random Access Memory (DRAM), RAMBUS® Dynamic Random Access Memory (RDRAM®) and/or any other type of random access memory device. Example non-volatile memory implementations include flash memory and/or any other desired type of memory device. In some examples, the example memory 1152 additionally or alternatively includes a non-transitory computer readable storage medium such as a CD or DVD.

In some examples, the functions of the example controller 1102 described herein are implemented by the example processor 1150 executing software (e.g., machine readable instructions) stored in the example memory 1152. Additionally or alternatively, any or all of the operations of the example controller 1102 described herein can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without necessarily executing software or firmware.

The example communication interface 1154 includes one or more hardware or software elements that enable the example controller to transmit signals (e.g., the first and second control signals) and/or receiving signals from one or more external entities (e.g., inside or outside the example actuation system 1100). The example communication interface 1154 may be implemented by any type of interface standard, such as an Ethernet interface, a universal serial bus (USB), a Bluetooth® interface, a near field communication (NFC) interface, and/or a PCI express interface. In some examples, the example communication interface 1154 includes a communication device such as a transmitter, a receiver, a transceiver, a modem, a residential gateway, a wireless access point, and/or a network interface to facilitate exchange of data with external machines (e.g., computing devices of any kind) via a network. The communication can be via, for example, an Ethernet connection, a digital subscriber line (DSL) connection, a telephone line connection, a coaxial cable system, a satellite system, a line-of-site wireless system, a cellular telephone system, etc. In some examples, the example communication interface 1154 includes any wired or wireless connection elements to communicatively couple the example controller 1102 with one or more components of the example actuation system 1100 (e.g., the example actuators 1108, 1118, etc.) and/or one or more components outside the example actuation system 1100.

In some examples, the example controller 1102 modulates the first control signal to cause the first example actuator 1108 to actuate a first group of vanes (e.g., via the first assembly of linkage structures 1110) according to a first schedule (e.g., the first schedule 1010 of FIG. 10). For example, the first control signal can be modulated based on a rotor speed of a compressor rotor (not shown). Additionally or alternatively, in these examples, the example controller 1102 modulates the second control signal to cause the second example actuator 1118 to actuate a second group of vanes (e.g., via the second assembly of linkage structures 1120) according to a second schedule (e.g., the second schedule 1020 of FIG. 10).

The first example actuator 1108 and the second example actuator 1118 are similar, respectively, to the first example actuator 608 and the second example actuator 618 of FIG. 6A.

The first example assembly of linkage structures 1110 includes one or more linkage structures to transfer an actuation motion induced by the first example actuator 1108 to a variable stator vane (e.g., the vane 616 of FIG. 6B). To that end, in the illustrated example of FIG. 11, the first example assembly of linkage structures 1110 includes an example actuation ring 1106 and an example lever 1124 that are similar, respectively, to the example actuation ring 606 and the example lever 624 of FIGS. 6A-6C. It is noted that the terms "linkages" and "linkage structures" may be used interchangeably in the present disclosure and may include links, actuation rings, levers, and/or any other type of linkage structures.

The second example assembly of linkage structures 1120 includes one or more linkage structures to transfer an actuation motion induced by the second example actuator 1118 to a variable stator vane (e.g., the vane 626 of FIG. 6B). To that end, in the illustrated example of FIG. 11, the second example assembly of linkage structures 1120 includes an example actuation ring 1104 and an example lever 1114 that are similar, respectively, to the example actuation ring 604 and the example lever 614 of FIGS. 6A-6C.

Thus, some examples disclosed herein enable split actuation for the first group of vanes and the second group of vanes included in a same row of variable stator vanes (and/or in a same compressor stage). By allowing different vane angles for vanes at different parts of a circumference of the compressor stage, in some scenarios, the examples disclosed herein facilitate improving compressor stability by means of stall and/or surge avoidance, such as when air flowing into a compressor is received via a distorted inlet (e.g., similar to the example inlets 102 and/or 202 of FIGS. 1-2).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that actuate different groups of variable stator vanes in a same compressor stage according to different schedules. More specifically, the examples described herein enable split actuation of a compressor variable geometry system according to two separate schedules.

Examples of split actuation compressor variable geometry systems are disclosed herein. Further examples and combinations thereof include the following:

Example 1 is a compressor including: a compressor stage including a plurality of variable stator vanes arranged along a circumference of the compressor stage; and an actuation system to actuate a first variable stator vane of the compressor stage according to a first schedule and to actuate a second variable stator vane of the compressor stage according to a second schedule.

Example 2 is the compressor of any preceding clause, wherein the actuation system includes: a first actuator to actuate, based on a first control signal, the first variable stator vane according to the first schedule; and a second actuator to actuate, based on a second control signal, the second variable stator vane according to the second schedule.

Example 3 is the compressor of any preceding clause, wherein the actuation system includes: an actuator coupled to the first variable stator vane and the second variable stator vane, the actuator to actuate the first variable stator vane according to the first schedule, and the actuator to actuate the second variable stator vane according to the second schedule; and an assembly of linkages to couple the actuator to the first variable stator vane and the second variable stator vane.

Example 4 is the compressor of any preceding clause, wherein the assembly of linkages includes: a first actuation ring extending around at least a portion of the compressor stage; a first lever extending from the first actuation ring toward the first variable stator vane; a second actuation ring extending around the at least portion of the compressor stage; a second lever extending from the second actuation ring toward the second variable stator vane; and a link to couple the first actuation ring with the second actuation ring.

Example 5 is the compressor of any preceding clause, further including: a casing, wherein the plurality of variable stator vanes are disposed inside the casing and extend toward a center axis of the compressor, and wherein the actuation system to actuate the first variable stator vane includes the actuation system to pivot the first variable stator vane relative to the casing.

Example 6 is the compressor of any preceding clause, wherein the actuation system includes: a first actuator disposed outside the casing and coupled to the first variable stator vane via a first assembly of linkage structures, the first actuator to actuate the first variable stator vane according to the first schedule based on a first control signal; and a second actuator disposed outside the casing coupled to the second variable stator vane via a second assembly of linkage structures, the second actuator to actuate the second variable stator vane according to the second schedule based on a second control signal.

Example 7 is the compressor of any preceding clause, wherein the first assembly of linkage structures includes a first split ring disposed outside the casing and a first lever extending from the first split ring to the first variable stator vane, and wherein the second assembly of linkage structures includes a second split ring disposed outside the casing and a second lever extending from the second split ring toward the second variable stator vane.

Example 8 is the compressor of any preceding clause, wherein the compressor is included in an axial flow turbomachine.

Example 9 is an axial flow turbomachine comprising: a compressor comprising a row of variable stator vanes arranged along a circumference of the compressor; a curved inlet to direct a flow of air into the compressor; and an actuation system to actuate a first variable stator vane of the row of variable stator vanes according to a first schedule and to actuate a second variable stator vane of the row of variable stator vanes according to a second schedule.

Example 10 is the axial flow turbomachine of any preceding clause, wherein the actuation system includes: a first actuator to actuate, based on a first control signal, the first variable stator vane according to the first schedule; and a second actuator to actuate, based on a second control signal, the second variable stator vane according to the second schedule.

Example 11 is the axial flow turbomachine of any preceding clause, wherein the actuation system further includes: a first assembly of linkage structures to couple the first actuator with the first variable stator vane; and a second assembly of linkage structures to couple the second actuator with the second variable stator vane.

Example 12 is the axial flow turbomachine of any preceding clause, wherein the first assembly of linkage structures includes: a first actuation ring extending around at least a portion of the compressor stage; and a first lever extending from the first actuation ring toward the first variable stator vane.

Example 13 is the axial flow turbomachine of any preceding clause, further including: a casing, wherein the row of variable stator vanes are disposed inside the casing, and wherein the actuation system to actuate the first variable stator vane includes the actuation system to pivot the first variable stator vane relative to the casing.

Example 14 is an apparatus comprising: a first actuator; a first assembly of linkage structures to couple the first actuator with a first variable stator vane in a compressor stage; a second actuator; and a second assembly of linkage structures to couple the second actuator with a second variable stator vane in the compressor stage.

Example 15 is the apparatus of any preceding clause, wherein the first actuator is to actuate the first variable stator vane according to a first schedule, and wherein the second actuator is to actuate the second variable stator vane according to a second schedule.

Example 16 is the apparatus of any preceding clause, wherein the first assembly of linkage structures includes: a first actuation ring to extend around at least a portion of a circumference of the compressor stage; and a first lever to extend from the first actuation ring to the first variable stator vane.

Example 17 includes the apparatus of any preceding clause, wherein the second assembly of linkage structures comprises: a second actuation ring; and a second lever extending from the second actuation ring toward the second variable stator vane.

Example 18 includes the apparatus of any preceding clause, wherein the first lever extends away from the first actuation ring in a first direction toward the first variable stator vane, and wherein the second lever extends away from the second actuation ring in the first direction toward the second variable stator vane.

Example 19 includes the apparatus of any preceding clause, wherein the first lever extends away from the first actuation ring in a first direction toward the first variable stator vane, and wherein the second lever extends away from the second actuation ring in a second direction toward the second variable stator vane.

Example 20 includes the apparatus of any preceding clause, wherein the first actuation ring is a split ring that overlaps a given portion of the circumference of the compressor stage.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A compressor comprising:

a compressor stage including a plurality of variable stator vanes arranged along a circumference of the compressor stage; and an actuation system to actuate a first variable stator vane of the compressor stage according to a first schedule and to actuate a second variable stator vane of the compressor stage according to a second schedule, the first schedule different from the second schedule, the actuation system including:

an actuator coupled to both the first variable stator vane and the second variable stator vane, the actuator, in response to a single actuation control signal, to actuate the first variable stator vane according to a first actuation motion and to actuate the second variable stator vane according to a second actuation motion, the first actuation motion different from the second actuation motion; and an assembly of linkages to couple the actuator to the first variable stator vane and to the second variable stator vane, the assembly of linkages including:

a first actuation ring extending around at least a portion of the compressor stage;

a first lever extending from the first actuation ring toward the first variable stator vane;

a second actuation ring extending around the at least a portion of the compressor stage;

a second lever extending from the second actuation ring toward the second variable stator vane; and a link to kinematically couple the first actuation ring and the second actuation ring to the actuator;

wherein the actuator is connected to the first actuation ring such that a movement of the first actuation ring causes the link to move the second variable vane according to the second actuation motion.

2. The compressor of claim 1, wherein the first actuation ring is a first split ring; and wherein the second actuation ring is a second split ring.

3. The compressor of claim 1, further including:

a casing, wherein the plurality of variable stator vanes are disposed inside the casing and extend toward a center axis of the compressor, and wherein the actuation system to actuate the first variable stator vane includes the actuation system to pivot the first variable stator vane relative to the casing.

4. The compressor of claim 3, wherein the assembly of linkages further includes:

a first split ring disposed outside the casing and a first lever extending from the first split ring to the first variable stator vane, and a second split ring disposed outside the casing and a second lever extending from the second split ring toward the second variable stator vane.

5. The compressor of claim 1, wherein the compressor is included in an axial flow turbomachine.

6. An axial flow turbomachine comprising:

a compressor comprising a row of variable stator vanes arranged along a circumference of the compressor;

a curved inlet to direct a flow of air into the compressor; and an actuation system to actuate a first variable stator vane of the row of variable stator vanes according to a first schedule and to actuate a second variable stator vane of the row of variable stator vanes according to a second schedule, the first schedule different from the second schedule, the actuation system including:

an actuator coupled to both the first variable stator vane and the second variable stator vane, the actuator, in response to a single actuation control signal, to actuate the first variable stator vane according to a first actuation motion and to actuate the second variable stator vane according to a second actuation motion, the first actuation motion different from the second actuation motion; and an assembly of linkages to couple the actuator to the first variable stator vane and to the second variable stator vane, the assembly of linkages including:

a first actuation ring extending around at least a portion of the compressor;

a first lever extending from the first actuation ring toward the first variable stator vane;

a second actuation ring extending around the at least a portion of the compressor;

a second lever extending from the second actuation ring toward the second variable stator vane; and a link to kinematically couple the first actuation ring and the second actuation ring to the actuator;

wherein the actuator is connected to the first actuation ring such that a movement of the first actuation ring causes the link to move the second variable vane according to the second actuation motion.

7. The axial flow turbomachine of claim 6, wherein:

the first actuation ring extends around at least a portion of the compressor.

8. The axial flow turbomachine of claim 6, further including:

a casing, wherein the row of variable stator vanes is disposed inside the casing, and wherein the actuation system to actuate the first variable stator vane includes the actuation system to pivot the first variable stator vane relative to the casing.

9. An apparatus comprising:

an actuation system to actuate a first variable stator vane of a compressor stage according to a first schedule and to actuate a second variable stator vane of the compressor stage according to a second schedule, the first schedule different from the second schedule, the actuation system including:

a first actuator coupled to both the first variable stator vane and the second variable stator vane, the first actuator to actuate the first variable stator vane according to a first actuation motion and to actuate the second variable stator vane according to a second actuation motion;

a first actuation ring to couple the first actuator with the first variable stator vane in the compressor stage;

a first lever connecting the first actuation ring to the first variable stator vane;

a second actuation ring to couple the second variable stator vane of the compressor stage;

a second lever connecting the second actuation ring to the second variable stator vane; and a link to kinematically couple the first actuation ring and the second actuation ring to the first actuator, wherein the first actuator is to actuate the first and second variable stator vanes according to a first schedule and a second schedule in response to a single control signal, the first and second schedules being different;

wherein the first variable stator vane actuates according to a first actuation motion and the second variable stator vane actuates according to a second actuation motion, the first actuation motion different from the second actuation motion;

wherein the first actuator is connected to the first actuation ring such that a movement of the first actuation ring causes the link to move the second variable vane according to the second actuation motion.

10. The apparatus of claim 9, wherein the first actuation ring extends around at least a portion of a circumference of the compressor stage.

11. The apparatus of claim 9, wherein the first lever extends away from the first actuation ring in a first direction toward the first variable stator vane, and wherein the second lever extends away from the second actuation ring in the first direction toward the second variable stator vane.

12. The apparatus of claim 9, wherein the first lever extends away from the first actuation ring in a first direction toward the first variable stator vane, and wherein the second lever extends away from the second actuation ring in a second direction toward the second variable stator vane, the first direction different from the second direction.

13. The apparatus of claim 10, wherein the first actuation ring is a split ring that overlaps a given portion of the circumference of the compressor stage.

* * * * *